Patented July 14, 1942

2,289,544

UNITED STATES PATENT OFFICE 2,289,544

THIOETHER SUBSTITUTED CYANAMIDES

Ingenuin Hechenbleikner, Stamford, Conn., and Christian Best, Champaign, Ill., assignors to American Cyanamid Company, New York, N. Y., a corporation of Maine No Drawing. Application April 2, 1940,
Serial No. 327,457

4 Claims. (Cl. 260—551)

This invention relates to new disubstituted cyanamide compounds of the formula

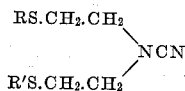

where R and R' represent the same aliphatic hydrocarbon radical.

These compounds may be generally prepared by the reaction between the corresponding secondary amine, cyanogen chloride and caustic soda. A preferred equation for this reaction is as follows:

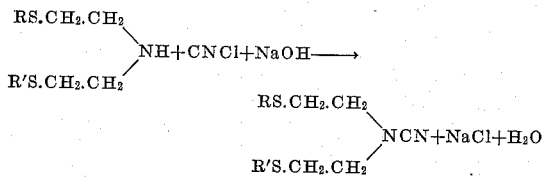

Example 1

16.5 grams of $\beta, \beta'$-di(methylthio)diethyl amine are dissolved in 100 cc. of ether. After cooling the solution to 0–5° C., 6.1 grams of cyanogen chloride are gradually added with stirring. When this addition is completed, the mixture is agitated with a solution of 4 grams of sodium hydroxide dissolved in 20 cc. of water and allowed to stand for about 1 hour. The reaction mixture is washed with dilute hydrochloric acid and then with water. The water layer is removed and discarded. The solvent layer is dried with a small amount of anhydrous sodium sulphate. The ether is removed by distillation. The residue is vacuum distilled and the product identified as $\beta, \beta'$-di(methylthio)-diethyl cyanamide.

Example 2

24.9 grams of $\beta, \beta'$-di(butylthio)diethyl amine are dissolved in 150 cc. of ether. After cooling the solution to 0–5° C., 6.1 grams of cyanogen chloride are gradually added with stirring. When this addition is completed, the mixture is agitated with a solution of 4 grams of sodium hydroxide dissolved in 20 cc. of water and allowed to stand for about 1 hour. The reaction mixture is washed with dilute hydrochloric acid and then with water. The water layer is removed and discarded. The solvent layer is dried with a small amount of anhydrous sodium sulphate. The ether is removed by distillation. The residue is vacuum distilled and the product identified as $\beta, \beta'$-di(butylthio)diethyl cyanamide.

Example 3

36.1 grams of $\beta, \beta'$-di(octylthio)diethyl amine are dissolved in 200 cc. of ether. After cooling the solution to 0–5° C., 6.1 grams of cyanogen chloride are gradually added with stirring. When this addition is completed, the mixture is agitated with a solution of 4 grams of sodium hydroxide dissolved in 20 cc. of water and allowed to stand for about 1 hour. The reaction mixture is washed with dilute hydrochloric acid and then with water. The water layer is removed and discarded. The solvent layer is dried with a small amount of anhydrous sodium sulphate. The ether is removed by distillation. The residue is vacuum distilled and the product identified as $\beta, \beta'$-di(octylthio)diethyl cyanamide.

Similarly other disubstituted cyanamides of the above class may be prepared, utilizing the corresponding secondary amine.

It is to be understood that the above examples are illustrative only.

These new compounds are particularly useful as intermediates and may be applied to the insecticide and plasticizing arts.

While the invention has been described with particular reference to sepcific embodiments it is to be understood that it is not to be limited thereto but is to be construed broadly and restricted solely by the scope of the appended claims.

We claim:

1. As a new compound, a disubstituted cyanamide of the formula

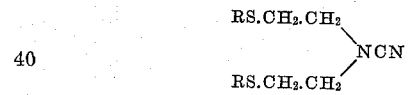

where R is a normal saturated aliphatic hydrocarbon radical.

2. As a new compound, $\beta, \beta'$-di(methylthio)-diethyl cyanamide.

3. As a new compound, $\beta, \beta'$-di(butylthio)-diethyl cyanamide.

4. As a new compound, $\beta, \beta'$-di(octylthio)-diethyl cyanamide.

INGENUIN HECHENBLEIKNER.
CHRISTIAN BEST.